United States Patent
Shabi et al.

(10) Patent No.: US 11,321,003 B2
(45) Date of Patent: May 3, 2022

(54) EXTENDING DEDUPLICATION MATCHES USING DATA COMPARISON

(71) Applicant: EMC IP Holding Company LLC, Hopkinton, MA (US)

(72) Inventors: Uri Shabi, Tel Mond (IL); Ronen Gazit, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 88 days.

(21) Appl. No.: 16/668,538

(22) Filed: Oct. 30, 2019

(65) Prior Publication Data

US 2021/0132835 A1 May 6, 2021

(51) Int. Cl.
*G06F 3/06* (2006.01)

(52) U.S. Cl.
CPC ............ *G06F 3/0641* (2013.01); *G06F 3/067* (2013.01); *G06F 3/0614* (2013.01); *G06F 3/0653* (2013.01)

(58) Field of Classification Search
CPC .... G06F 3/0641; G06F 3/0614; G06F 3/0653; G06F 3/067; G06F 3/0604; G06F 3/0638; G06F 3/0671; G06F 3/0673; G06F 3/0683
See application file for complete search history.

(56) References Cited

U.S. PATENT DOCUMENTS

| | | |
|---|---|---|
| 5,990,810 A | 11/1999 | Williams |
| 8,234,468 B1 * | 7/2012 | Deshmukh .......... G06F 11/1453 711/162 |
| 8,538,933 B1 * | 9/2013 | Hu ........................ G06F 3/0689 707/692 |
| 8,799,601 B1 | 8/2014 | Chen et al. |
| 8,805,796 B1 * | 8/2014 | Hu ........................ G06F 3/0641 707/692 |
| 9,569,455 B1 | 2/2017 | Bono et al. |
| 9,846,718 B1 * | 12/2017 | Ruef .................... G06F 3/0641 |
| 10,037,336 B1 | 7/2018 | Hu et al. |
| 10,437,502 B2 | 10/2019 | Shadrin et al. |
| 2011/0238635 A1 | 9/2011 | Leppard |
| 2013/0097380 A1 | 4/2013 | Colgrove et al. |
| 2014/0115260 A1 | 4/2014 | Maybee et al. |
| 2015/0205716 A1 * | 7/2015 | Moon ...................... G06F 3/06 711/159 |
| 2015/0370495 A1 * | 12/2015 | Georgiev .............. G06F 3/0641 711/114 |

(Continued)

OTHER PUBLICATIONS

Armangau, Philippe, et al.; "Inline Deduplication of Compressed Data," U.S. Appl. No. 14/980,944, filed Dec. 28, 2015.

(Continued)

*Primary Examiner* — Michael Krofcheck
(74) *Attorney, Agent, or Firm* — BainwoodHuang (57) ABSTRACT

A technique for performing deduplication extends a match found in a digest database by looking forward and/or backward to adjacent data elements. The technique performs data comparisons between data blocks adjacent to a candidate block and corresponding data blocks adjacent to an identified target block. If the data comparisons indicate that an adjacent candidate block matches an adjacent target block, then the adjacent candidate block may be deduplicated to the adjacent target block without having to compute a hash value of the adjacent candidate block or to perform a separate lookup into the digest database.

16 Claims, 4 Drawing Sheets

(56) References Cited

U.S. PATENT DOCUMENTS

| | | |
|---|---|---|
| 2016/0188622 A1 | 6/2016 | Sharangpani |
| 2018/0004434 A1 | 1/2018 | Khan et al. |
| 2018/0081591 A1* | 3/2018 | Maheshwari ......... G06F 3/0685 |
| 2018/0285379 A1 | 10/2018 | Dain et al. |

OTHER PUBLICATIONS

Armangau, Philippe, et al.; "Speeding De-Duplication Using a Temporal Digest Cache," U.S. Appl. No. 15/668,388, filed Aug. 3, 2017.

Armangau, Philippe, et al.; "Speeding Deduplication Using a Most Wanted Digest Cache," U.S. Appl. No. 15/799,117, filed Oct. 31, 2017.

Swift, Jeremy; "Deduplication and Compression of Data Segments in a Data Storage System," U.S. Appl. No. 15/976,371, filed May 10, 2018.

\* cited by examiner

EXTENDING DEDUPLICATION MATCHES USING DATA COMPARISON

BACKGROUND

Data storage systems are arrangements of hardware and software in which storage processors are coupled to arrays of non-volatile storage devices, such as magnetic disk drives, electronic flash drives, and/or optical drives. The storage processors service storage requests, arriving from host machines ("hosts"), which specify blocks, files, and/or other data elements to be written, read, created, deleted, and so forth. Software running on the storage processors manages incoming storage requests and performs various data processing tasks to organize and secure the data elements on the non-volatile storage devices.

Some storage systems use a process called "deduplication" to improve storage efficiency. For example, a storage system maintains a database of entries, in which each entry stores a digest of a respective block of data and a pointer to a stored version of that block in the storage system. The storage system computes each digest as a hash of a respective block, such that different blocks produce different hash values (digests) and identical blocks produce the same hash values. The high uniqueness of hash values enables the storage system to use them as representatives of respective blocks, even though the hash values themselves are typically much smaller than the blocks they represent. When a storage system receives a write request that specifies a candidate block to be stored at a designated logical address, the storage system computes a hash of the candidate block and performs a lookup into the database for the computed hash. If a match is found, the storage system may confirm the match by comparing the newly-arriving block with the block pointed to by the matching digest entry. Assuming the blocks match, the storage system effectuates storage of the newly-arriving block by pointing its logical address to the previously-stored block pointed to by the matching entry. Redundant storage of the block is therefore avoided. Deduplication may be run in-line with storage requests, near inline, or in the background.

SUMMARY

Conventional deduplication schemes operate on one data element at a time. For example, a hash is computed from a single candidate data block and a lookup is performed for the resulting hash value in a digest database. If the lookup results in a match to the computed hash value, the match identifies a single target block. Deduplication then proceeds by mapping a logical address of the candidate block to a location where the data of the single target block is stored. A similar process is repeated for each candidate block individually, i.e., a hash value is computed for each candidate block and a separate lookup is performed into the digest database, with mapping adjusted accordingly if a match is found. Unfortunately, such repeated operations on different data blocks can be burdensome to a storage system, in terms of both memory and computational resources. Also, the scope of potential targets of deduplication is limited to blocks for which digests have already been computed and stored in the digest database.

In contrast with conventional schemes, in which deduplication operates one data element at a time, an improved technique for performing deduplication extends a match found in a digest database by looking forward and/or backward to adjacent data elements. The technique performs data comparisons between data blocks adjacent to a candidate block and corresponding data blocks adjacent to an identified target block. If the data comparisons indicate that an adjacent candidate block matches an adjacent target block, then the adjacent candidate block may be deduplicated to the adjacent target block without having to compute a hash value of the adjacent candidate block or to perform a separate lookup into the digest database. Advantageously, a single hash computation and lookup can result in multiple block matches, reducing memory and computational burdens on the storage system. Also, the block matches are not limited to target blocks for which digests have already been computed. In some examples, the improved technique is applicable to exact block matches, partial block matches, and/or unaligned block matches.

Certain embodiments are directed to a method of performing data deduplication. The method includes accessing a candidate block and a set of adjacent candidate blocks adjacent to the candidate block. In response to finding a matching entry in a database to the candidate block, the method further includes accessing a target block referenced by the matching entry in the database and accessing a set of adjacent target blocks adjacent to the target block. The method still further includes performing a data comparison between at least one of the set of adjacent candidate blocks and at least one of the set of adjacent target blocks and, in response to the data comparison indicating one or more matches, effectuating storage of each matched adjacent candidate block at least in part by providing a reference to the respective matching adjacent target block.

Other embodiments are directed to a computerized apparatus constructed and arranged to perform a method of performing data deduplication, such as the method described above. Still other embodiments are directed to a computer program product. The computer program product stores instructions which, when executed on control circuitry of a computerized apparatus, cause the computerized apparatus to perform a method of performing data deduplication, such as the method described above.

According to some examples, the technique further includes effectuating storage of the candidate block at least in part by providing a reference to the target block.

According to some examples, performing the data comparison includes determining whether a first adjacent candidate block immediately adjacent to the candidate block matches a first adjacent target block immediately adjacent to the target block.

In some examples, determining whether the first adjacent candidate block matches the first adjacent target block includes confirming that the first adjacent candidate block differs from the first adjacent target block by less than a predetermined amount.

According to some examples, the technique further includes, in response to determining that the first adjacent candidate block matches the first adjacent target block, effectuating storage of the first adjacent candidate block by (i) providing a reference to the first adjacent target block and (ii) providing a reference to difference data computed based on a difference between the first adjacent candidate block and the first adjacent target block.

According to some aspects, the technique further includes computing the difference data as a bitwise XOR (exclusive-OR) of the first adjacent candidate block with the first adjacent target block.

In some examples, the method further includes; in response to determining that the first adjacent candidate block matches the first adjacent target block, determining whether a second adjacent candidate block immediately adjacent to the first adjacent candidate block matches a second adjacent target block immediately adjacent to the first adjacent target block by confirming that the second adjacent candidate block differs from the second adjacent target block by less than the predetermined amount; and effectuating storage of the second adjacent candidate block by (i) providing a reference to the second adjacent target block and (ii) providing a reference to second difference data computed based on a difference between the second adjacent candidate block and the second adjacent target block.

In some examples, the candidate block and the first adjacent candidate block are received together in a write request from an application in which the first adjacent candidate block precedes the candidate block.

In some examples, the candidate block and the first adjacent candidate block are received together in a write request from an application in which the first adjacent candidate block follows the candidate block.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION

Embodiments of the improved technique will now be described. One should appreciate that such embodiments are provided by way of example to illustrate certain features and principles but are not intended to be limiting.

An improved technique for performing deduplication extends a match found in a digest database by looking forward and/or backward to adjacent data elements. The technique performs data comparisons between data blocks adjacent to a candidate block and corresponding data blocks adjacent to an identified target block. If the data comparisons indicate that an adjacent candidate block matches an adjacent target block, then the adjacent candidate block may be deduplicated to the adjacent target block without having to compute a hash value of the adjacent candidate block or to perform a separate lookup into the digest database.

Figure 1:
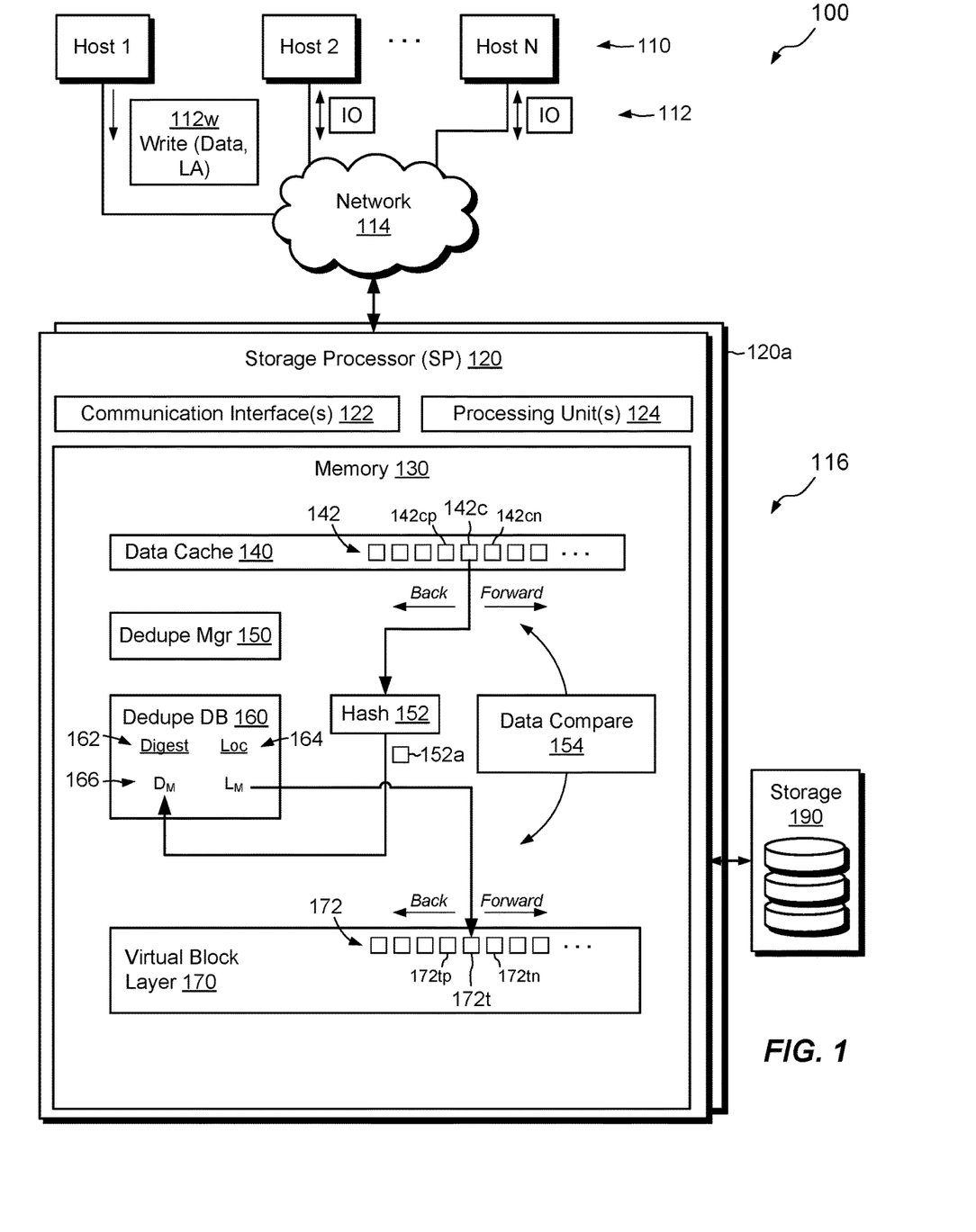
FIG. 1 is a block diagram of an example environment in which embodiments of the improved technique can be practiced.

FIG. 1 shows an example environment 100 in which embodiments of the improved technique can be practiced. Here, multiple hosts 110 access a data storage system 116 over a network 114. The data storage system 116 includes a storage processor, or "SP," 120 and storage 190, such as magnetic disk drives, electronic flash drives, and/or the like. The data storage system 116 may include multiple SPs (e.g., a second SP 120a). For example, multiple SPs may be provided as circuit board assemblies or blades, which plug into a chassis that encloses and cools the SPs. The chassis has a backplane for interconnecting the SPs, and additional connections may be made among SPs using cables. In some examples, the SP 120 is part of a storage cluster, such as one which contains any number of storage appliances, where each appliance includes a pair of SPs connected to shared storage devices. In some arrangements, a host application runs directly on the SP (or SPs), such that separate host machines 110 need not be provided. No particular hardware configuration is required, however, as any number of SPs may be used, including a single SP, in any arrangement, and the SP 120 can be any type of computing device capable of running software and processing host I/O's.

The network 114 may be any type of network or combination of networks, such as a storage area network (SAN), a local area network (LAN), a wide area network (WAN), the Internet, and/or some other type of network or combination of networks, for example. In cases where hosts 110 are provided, such hosts 110 may connect to the SP 120 using various technologies, such as Fibre Channel, iSCSI (Internet small computer system interface), NFS (network file system), and CIFS (common Internet file system), for example. As is known, Fibre Channel and iSCSI are block-based protocols, whereas NFS and CIFS are file-based protocols. The SP 120 is configured to receive I/O requests 112 according to block-based and/or file-based protocols and to respond to such I/O requests 112 by reading or writing the storage 190.

The SP 120 includes one or more communication interfaces 122, a set of processing units 124, and memory 130. The communication interfaces 122 include, for example, SCSI target adapters and/or network interface adapters for converting electronic and/or optical signals received over the network 114 to electronic form for use by the SP 120. The set of processing units 124 includes one or more processing chips and/or assemblies, such as numerous multi-core CPUs (central processing units). The memory 130 includes both volatile memory, e.g., RAM (Random Access Memory), and non-volatile memory, such as one or more ROMs (Read-Only Memories), disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 is made to carry out the operations of the software constructs. Although certain software constructs are specifically shown and described, it is understood that the memory 130 typically includes many other software components, which are not shown, such as an operating system, various applications, processes, and daemons.

As further shown in FIG. 1, the memory 130 "includes," i.e., realizes by execution of software instructions, a data cache 140, a deduplication ("dedupe") manager 150, a dedupe database 160, and a virtual block layer 170. The data cache 140 is configured to receive incoming writes of the I/O requests 112 and to store data 142 specified by those writes until the data 142 can be persisted in storage 190. The dedupe manager 150 is configured to orchestrate deduplication activities, such as maintaining the dedupe database 160 and directing deduplication of data blocks. The dedupe database 160 is configured to store entries that associate digests 162 of data blocks with corresponding storage locations 164 at which the respective data blocks can be found. In an example, each entry, such as entry 166, associates one digest 162 with one location 164. Digests 162 may be computed as cryptographic hashes, such as SHA-2 or MD-5, as semi-cryptographic hashes, which may be prone to occasional collisions, or as similarity hashes ("sim hashes"). As described below in connection with FIG. 3, sim hashes differ from one another in relation to differences in the data blocks from which they are created. Thus, sim hashes allow a storage system estimate the extent of differences between data blocks without having to compare the data blocks directly. In some examples, the dedupe database 160 is stored persistently in storage 190, with portions loaded into memory 130 as needed.

The virtual block layer 170 provides a representation of stored data, such as the data of target blocks 172t. As will be described, the SP 120 maps logical addresses of data blocks to corresponding addresses in the virtual block layer 170. In some cases, such as when deduplication is performed, multiple logical addresses map to a single virtual block, e.g., the address of a target block 172t in the virtual block layer 170.

The dedupe manager 150 is configured to build the dedupe database 160 by adding a new entry each time a data block is processed for deduplication but no match has yet been found. The dedupe manager 150 creates each entry by generating a digest 162 from a respective data block and storing the digest 162 in connection with a location 164 of that data block, which may be a cached location, a persisted location, or any other location.

In example operation, hosts 110 issue I/O requests 112 to the data storage system 116. The SP 120 receives the I/O requests 112 at the communication interface(s) 122 and initiates further processing. The I/O requests 112 include write requests 112w, which specify respective data and respective logical addresses (LAs) at which the respective data are to be written. In an example, the SP 120 receives the respective data into the data cache 140, which arranges the host data in data blocks 142.

In an example, the dedupe manager 150 accesses data blocks 142 in the data cache 140 as candidate blocks for deduplication. For example, the dedupe manager 150 obtains a candidate block 142c from the data cache 140 and operates a hash function 152 on that candidate block 152c to generate a hash value 152a. The hash function 152 may be a cryptographic hash function, a semi-cryptographic hash function, a sim hash function, or some other type of hash function, the particulars of which may vary in various embodiments. The dedupe manager 150 performs a lookup or search for the computed hash value 152a in the dedupe database 160, attempting to match the computed hash value 152a to a digest 162. Here, it is assumed that a match has been found to digest entry 166, which specifies a matching digest $D_M$ and a corresponding location $L_M$. The matching digest may be an exact match to the hash value 152a, e.g., where the hash function 152 is a cryptographic hash or a semi-cryptographic hash. It may also be a partial match, e.g., where the hash function 152 is a sim hash function. In any case, the location $L_M$ specified by the matching entry 166 points to the data of a target block 172t, which corresponds to the data from which the digest $D_M$ was created. The dedupe manager 150 may proceed to deduplicate the candidate block 142c, e.g., by pointing its logical address to the target block 172t.

In accordance with particular improvements hereof, the dedupe manager 150 attempts to extend the match beyond the target block 172t to adjacent target blocks, which may be previous target blocks and/or succeeding (next) target blocks. For example, certain blocks 142 in the data cache 140 may be formed from data elements written in increments larger than a block. For instance, a host application may issue write requests 112w that specify 16-kB chunks or 32-kB chunks, for example. The data cache 140 may arrange these chunks in smaller increments, such as 4-kB or 8-kB blocks 142. The data cache 140 preserves the order of blocks 142 formed from an arriving chunk, allowing the dedupe manager 160 to identify sequences of adjacent candidate blocks 142 in the data cache 140.

To extend a match beyond the target block 172t, a data compare operation 154 looks forward and/or back from the candidate block 142c and compares the adjacent candidate blocks with adjacently arranged target blocks. For instance, data compare operation 154 compares adjacent candidate block 142cn with adjacent target block 172tn. If the two blocks match, the data compare operation 154 may continue to the next candidate block and target block, proceeding in this fashion until a candidate block does not match a corresponding target block. In this sense, a "match" need not be exact. Rather, some threshold amount of difference may be permitted, such as some number of bytes. Provided that the candidate block matches the target block to within the allowed number of bytes, the comparison continues to the next candidate and target blocks until a match cannot be established. It is evident in this example that the data compare operation 154 is comparing actual data of the candidate blocks and target blocks, rather than relying on matching of digests 162. The data compare operation 154 may look backward the same way it looks forward, e.g., by comparing adjacent candidate block 142cp to adjacent target block 172tp and continuing in the backward direction until the blocks no longer match.

In cases where partial matches are achieved, the dedupe manager 150 may generate difference data that reflects the differences between a candidate block and a target block. In an example, difference data is computed as a bitwise XOR (exclusive-OR) of a candidate block with a target block, the result of which produces a "0" at each bit position where the bits match but produces a "1" at each bit position where the bits do not match. The dedupe manager 150 may compress the results of the XOR operation and store a reference to those results in system metadata. Later, when it becomes necessary to reconstruct the candidate block, the SP 120 can obtain the target block and the difference data, decompress them, and XOR them together, with the result of the XOR restoring the original candidate block.

Figure 2:
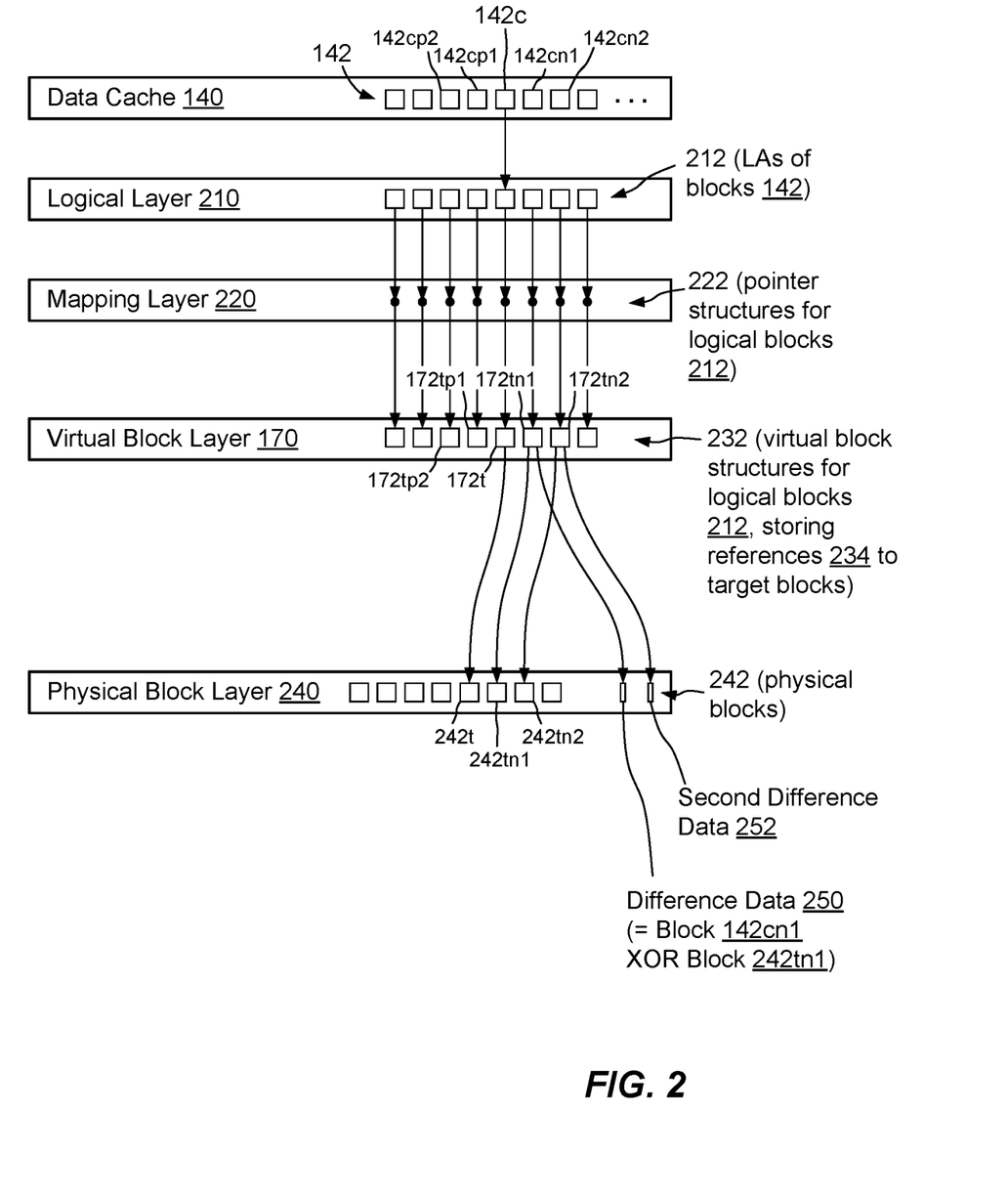
FIG. 2 is a block diagram of an example arrangement for mapping adjacent candidate blocks to adjacent target blocks.

FIG. 2 shows example details of system mapping of candidate blocks to target blocks in the environment of FIG. 1. The structures shown in FIG. 2 may reside in the memory 130 of the SP 120.

As shown, the data cache 140 stores blocks 142, which include a candidate block 142c and adjacent candidate blocks, such as blocks 142cn1, 142cn2, 142cp1, and 142cp2. For example, the blocks 142 may have recently been written to the data storage system by hosts 110. Each block 142 may have an associated logical address (LA), which was specified in the I/O request 112 that wrote the block (or the chunk to which the block belongs). Each logical address 212 may correspond to a host address of the block, such as an offset into a file, a range of a LUN (Logical UNit), or the like.

SP 120 represents each logical address 212 of the blocks 142 in a logical storage layer 210. The SP 120 maps the logical addresses 212 to lower layers using mapping structures 222 (e.g., block pointers) in a mapping layer 220. The mapping layer 220 maps the logical addresses 212 to virtual block structures 232 in the virtual block layer 170, and the virtual block structures 232 map to a physical block layer 240. As the depicted arrangement supports partial block matching, virtual block structures 232 in the virtual block layer 170 may provide two pointers, a first pointer to a target block and a second pointer to difference data. As shown, virtual block 172*tn*1 includes two references 234. A first reference 234 points to physical block 242*tn*1 in the physical block layer 240, and a second reference 234 points to difference data 250. As described previously, the difference data 250 may be provided as a compressed version of the adjacent candidate block 142*cn*1 XORed with the contents of the adjacent target block 242*tn*1. In a like manner, adjacent target block 172*tn*2 includes references to both contents 242*tn*2 and second difference data 252. Additional layers (not shown) further map the physical blocks 242 to storage 190.

Figure 3:
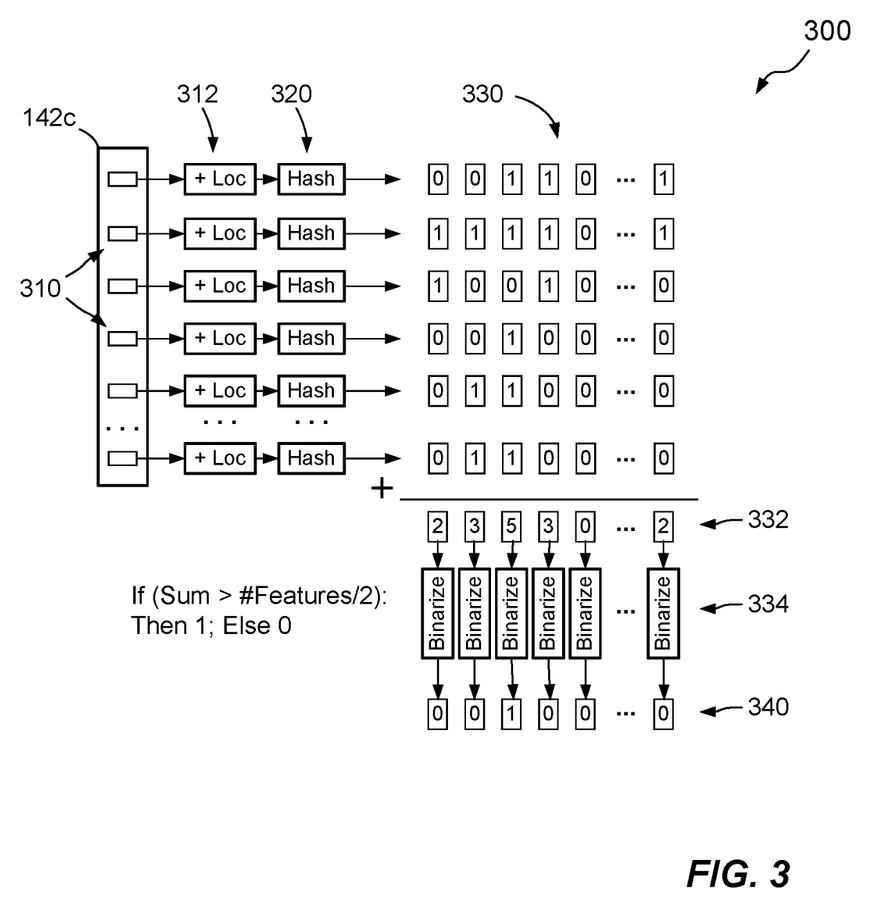
FIG. 3 is a block diagram of an example arrangement for generating a similarity hash.

FIG. 3 shows an example arrangement 300 for generating a similarity hash (sim hash) 340. Many methods may be used for generating sim hashes, and the example shown is intended to be illustrative rather than limiting.

The illustrated approach begins by obtaining a candidate block 142*c* and dividing the block into multiple features 310. Each feature 310 is a portion of the candidate block 142*c*, and together the features 310 make up the entire candidate block 142*c*. Features 310 may be arbitrarily small, with 4 or 8 Bytes being expected sizes. There is no need for different features 310 to have the same length, however.

As shown by arrow 312, the data of each feature 310 is salted with a location indicator, which corresponds, for example, to a relative position of the respective feature in the block 142*c*. For instance, the first feature (topmost) may be salted by concatenating this feature with a "1," the second feature may be salted by concatenating it with a "2," and so forth. Salting each feature 310 with an indicator of its position ensures that the same feature is represented differently when it appears in different positions within the block 142*c*.

As shown by arrow 320, a hash function is executed on each salted feature 310 individually. The hash function may be a fully cryptographic or semi-cryptographic hash function, for example.

As shown by arrow 330, each hash function produces a respective hash value, with one hash value produced for each feature 310. The bits of each hash value are shown horizontally, e.g., with the MSB of the hash value on the left and the LSB on the right.

The corresponding bits of the hash values are then summed (vertically) to produce a column sum 332 for each bit position of the feature-hashes. The column sums 332 are then binarized (334) to produce respective results. Binarizing each sum 332 includes, for example, setting the result to "1" if the column sum is greater than the number of features 310 in the block 142*c* divided by 2 and setting the result to "0" otherwise. Stated another way, results are set to "1" if more than half the bits in the column are "1;" otherwise they are set to "0." The results of binarization taken together and in order form a sim hash 340. The sim hash 340 thus includes a bit for each bit of the feature-hashes 330.

The sim hash 340 has the desired property of producing similar results for similar candidate blocks 142*c* but of producing increasingly different results for increasingly different candidate blocks 142*c*. The illustrated arrangement thus allows Hamming distances between sim hashes 340 to be used as a proxy for Hamming distances between the corresponding blocks. Owing to the manner in which sim hashes 340 are generated, they should generally not be relied upon for exact-block matching, as it is possible for two sim hashes 340 to be identical even though the underlying blocks are different.

Sim hashes 340 may form the entirety of digests 162 (one sim hash per digest), but this is not required. For example, digests 162 may include other components. These components may include full or semi-cryptographic hashes of respective blocks. They may also include sim hashes of particular sub-blocks. According to some variants, each digest 162 includes a sim hash of a particular sector of the respective block. The particular sector may be selected as the highest entropy sector in the block, such that blocks can be matched even if they are misaligned relative to usual block boundaries. In some examples, digests 162 include sector sim hashes but not full-block sim hashes, with the same methodology applied (e.g., buckets and subsets) as described above, but operating based on sector sim hashes rather than on full-block sim hashes.

Figure 4:
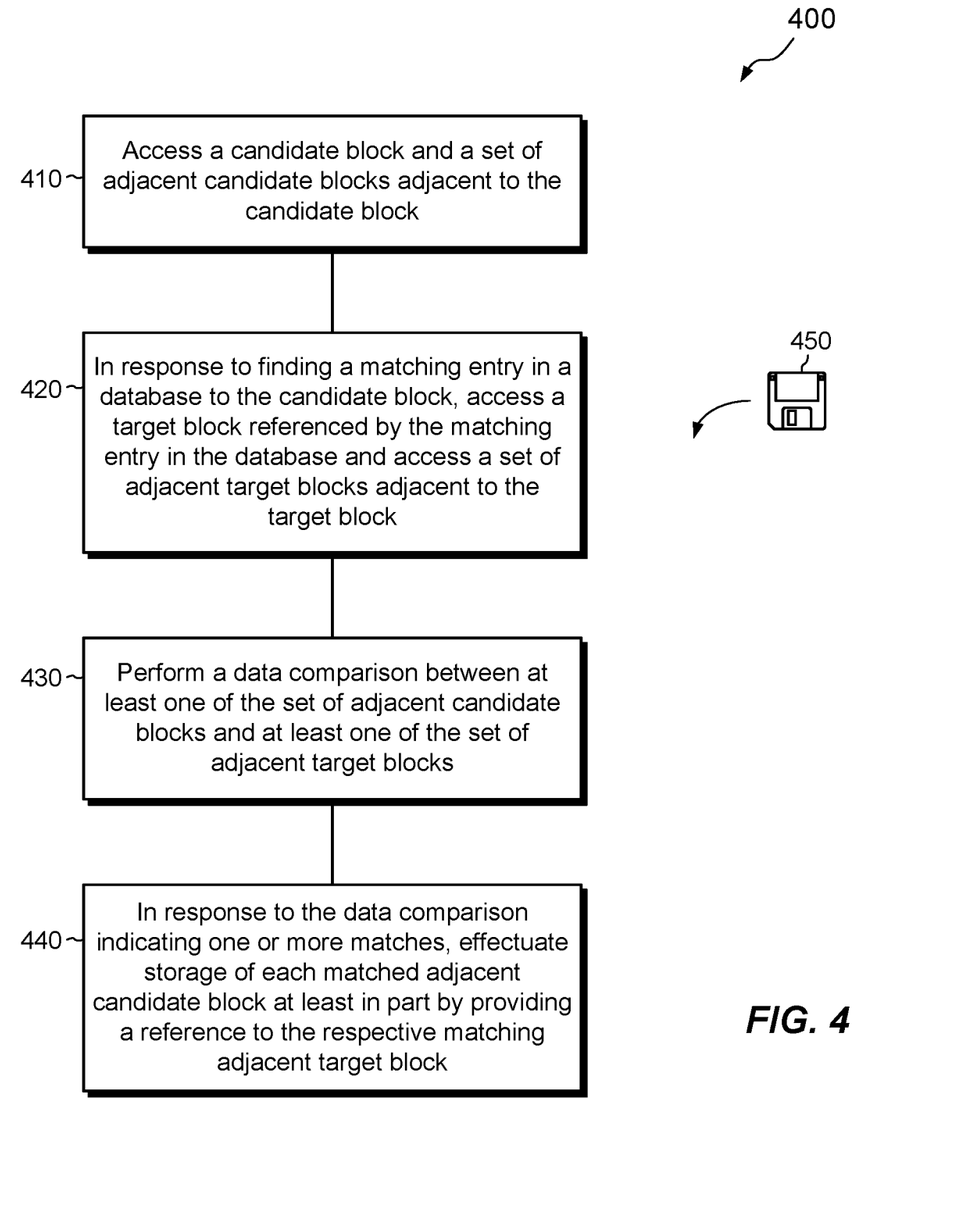
FIG. 4 is a flowchart showing an example method of performing deduplication.

FIG. 4 shows an example method 400 that may be carried out in connection with the environment 100. The method 400 is typically performed, for example, by the software constructs described in connection with FIG. 1, which reside in the memory 130 of the storage processor 120 and are run by the set of processing units 124. The various acts of method 400 may be ordered in any suitable way. Accordingly, embodiments may be constructed in which acts are performed in orders different from that illustrated, which may include performing some acts simultaneously.

At 410, SP 120 accesses a candidate block 142*c* and a set of adjacent candidate blocks adjacent to the candidate block 142*c*, such as adjacent candidate blocks 142*cn*1, 142*cn*2, 142*cp*1, 142*cp*2, and so forth.

At 420, in response to finding a matching entry 166 in a database 160 to the candidate block 142*c*, the SP 120 accesses a target block 172*t* referenced by the matching entry 166 in the database 160 and accesses a set of adjacent target blocks adjacent to the target block, such as adjacent target blocks 172*tn*1, 172*tn*2, 172*tp*1, 172*tp*2, and so forth.

At 430, a data comparison 154 is performed between at least one of the set of adjacent candidate blocks, e.g., any of 142*cn*1, 142*cn*2, 142*cp*1, 142*cp*2, and so forth, and at least one of the set of adjacent target blocks, e.g., any of blocks 172*tn*1, 172*tn*2, 172*tp*1, 172*tp*2, and so forth.

At 440, in response to the data comparison 154 indicating one or more matches, SP 120 effectuates storage of each matched adjacent candidate block at least in part by providing a reference 234 to the respective matching adjacent target block.

An improved technique has been described for performing deduplication. The technique extends a match found in a digest database 160 by looking forward and/or backward to adjacent data elements. The technique performs data comparisons between data blocks adjacent to a candidate block 142*c* and corresponding data blocks adjacent to an identified target block 172*t*. If the data comparisons indicate that an adjacent candidate block matches an adjacent target block, then the adjacent candidate block may be deduplicated to the adjacent target block without having to compute a hash value 152*a* of the adjacent candidate block or to perform a separate lookup into the digest database 160. Advantageously, a single hash computation and lookup can result in multiple block matches, reducing memory and computational burdens on the storage system. Also, the block matches are not limited to target blocks for which digests have already been computed. The improved technique is applicable to exact block matches, as well as to partial block matches and/or unaligned block matches.

Having described certain embodiments, numerous alternative embodiments or variations can be made. For example, although embodiments have been described in which candidate blocks 142c are obtained from a data cache 140, they may alternatively be obtained from other sources, which may include persistent storage. Thus, there is no requirement that embodiments be limited to inline deduplication. To the contrary, embodiments may also be used in connection with near-inline deduplication and/or background deduplication, as well as inline deduplication. Also, although a particular mapping structure is shown and described (FIG. 2), the illustrated structure is merely provided for illustrative purposes and is not intended to be limiting.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 450 in FIG. 4). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, the terms "based on" and "based upon" should be interpreted as meaning "based at least in part on" or "based at least in part upon," as bases need not be exclusive unless explicitly stated. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of performing data deduplication, the method comprising:
    accessing a candidate block and a set of adjacent candidate blocks adjacent to the candidate block;
    in response to finding a matching entry in a database to the candidate block, accessing a target block referenced by the matching entry in the database and accessing a set of adjacent target blocks adjacent to the target block;
    performing a data comparison between at least one of the set of adjacent candidate blocks and at least one of the set of adjacent target blocks; and
    in response to the data comparison indicating one or more matches, effectuating storage of each matched adjacent candidate block at least in part by providing a reference to the respective matching adjacent target block,
    wherein performing the data comparison includes determining whether a first adjacent candidate block immediately adjacent to the candidate block matches a first adjacent target block immediately adjacent to the target block by confirming that the first adjacent candidate block differs from the first adjacent target block by no more than an allowed number of bytes.

2. The method of claim 1, further comprising effectuating storage of the candidate block at least in part by providing a reference to the target block.

3. The method of claim 1, wherein the method further comprises, in response to determining that the first adjacent candidate block matches the first adjacent target block, effectuating storage of the first adjacent candidate block by (i) providing a reference to the first adjacent target block and (ii) providing a reference to difference data computed based on a difference between the first adjacent candidate block and the first adjacent target block.

4. The method of claim 3, wherein the method further comprises computing the difference data as a bitwise XOR (exclusive-OR) of the first adjacent candidate block with the first adjacent target block.

5. The method of claim 3, further comprising providing a single virtual block to includes the reference to the first adjacent target block and the reference to the difference data.

6. The method of claim 1, further comprising, in response to determining that the first adjacent candidate block matches the first adjacent target block:
    determining whether a second adjacent candidate block immediately adjacent to the first adjacent candidate block matches a second adjacent target block immediately adjacent to the first adjacent target block by confirming that the second adjacent candidate block differs from the second adjacent target block by less than the predetermined amount; and
    effectuating storage of the second adjacent candidate block by (i) providing a reference to the second adjacent target block and (ii) providing a reference to second difference data computed based on a difference between the second adjacent candidate block and the second adjacent target block.

7. The method of claim 1, wherein the candidate block and the first adjacent candidate block are received together in a write request from an application in which the first adjacent candidate block precedes the candidate block.

8. The method of claim 1, wherein the candidate block and the first adjacent candidate block are received together in a write request from an application in which the first adjacent candidate block follows the candidate block.

9. A computerized apparatus, comprising control circuitry that includes a set of processing units coupled to memory, the control circuitry constructed and arranged to:
   access a candidate block and a set of adjacent candidate blocks adjacent to the candidate block;
   in response to finding a matching entry in a database to the candidate block, access a target block referenced by the matching entry in the database and access a set of adjacent target blocks adjacent to the target block;
   perform a data comparison between at least one of the set of adjacent candidate blocks and at least one of the set of adjacent target blocks; and
   in response to the data comparison indicating one or more matches, effectuate storage of each matched adjacent candidate block at least in part by providing a reference to the respective matching adjacent target block,
   wherein the control circuitry constructed and arranged to perform the data comparison is further constructed and arranged to determine whether a first adjacent candidate block immediately adjacent to the candidate block matches a first adjacent target block immediately adjacent to the target block by confirming that the first adjacent candidate block differs from the first adjacent target block by less than a predetermined amount, the predetermined amount being no more than an allowed number of bytes.

10. A computer program product including a set of non-transitory, computer-readable media having instructions which, when executed by control circuitry of a computerized apparatus, cause the computerized apparatus to perform a method of performing data deduplication, the method comprising:
    accessing a candidate block and a set of adjacent candidate blocks adjacent to the candidate block;
    in response to finding a matching entry in a database to the candidate block, accessing a target block referenced by the matching entry in the database and accessing a set of adjacent target blocks adjacent to the target block;
    performing a data comparison between at least one of the set of adjacent candidate blocks and at least one of the set of adjacent target blocks; and
    in response to the data comparison indicating one or more matches, effectuating storage of each matched adjacent candidate block at least in part by providing a reference to the respective matching adjacent target block,
    wherein performing the data comparison includes determining whether a first adjacent candidate block immediately adjacent to the candidate block matches a first adjacent target block immediately adjacent to the target block by confirming that the first adjacent candidate block differs from the first adjacent target block by no more than an allowed number of bytes.

11. The computer program product of claim 10, wherein the method further comprises effectuating storage of the candidate block at least in part by providing a reference to the target block.

12. The computer program product of claim 10, wherein the method further comprises, in response to determining that the first adjacent candidate block matches the first adjacent target block, effectuating storage of the first adjacent candidate block by (i) providing a reference to the first adjacent target block and (ii) providing a reference to difference data computed based on a difference between the first adjacent candidate block and the first adjacent target block.

13. The computer program product of claim 12, wherein the method further comprises computing the difference data as a bitwise XOR (exclusive-OR) of the first adjacent candidate block with the first adjacent target block.

14. The computer program product of claim 10, wherein the method further comprises, in response to determining that the first adjacent candidate block matches the first adjacent target block:
    determining whether a second adjacent candidate block immediately adjacent to the first adjacent candidate block matches a second adjacent target block immediately adjacent to the first adjacent target block by confirming that the second adjacent candidate block differs from the second adjacent target block by less than the predetermined amount; and
    effectuating storage of the second adjacent candidate block by (i) providing a reference to the second adjacent target block and (ii) providing a reference to second difference data computed based on a difference between the second adjacent candidate block and the second adjacent target block.

15. The computer program product of claim 10, wherein the candidate block and the first adjacent candidate block are received together in a write request from an application in which the first adjacent candidate block precedes the candidate block.

16. The computer program product of claim 10, wherein the candidate block and the first adjacent candidate block are received together in a write request from an application in which the first adjacent candidate block follows the candidate block.

* * * * *